Sept. 27, 1932.　　　A. W. MOODY　　　1,879,630
SAFETY BRAKE
Filed Dec. 1, 1930
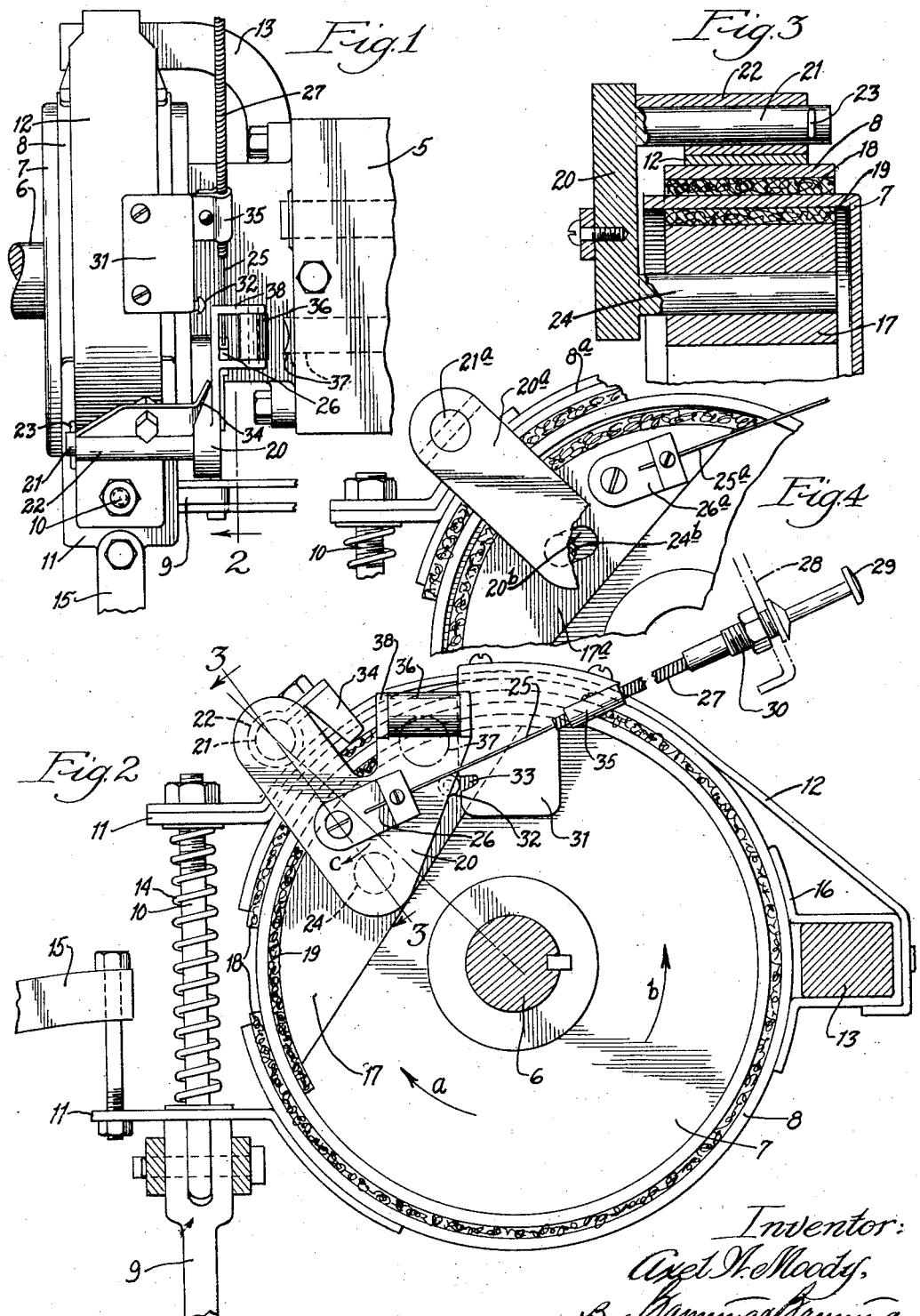

Patented Sept. 27, 1932

1,879,630

UNITED STATES PATENT OFFICE

AXEL W. MOODY, OF ELGIN, ILLINOIS

SAFETY BRAKE

Application filed December 1, 1930. Serial No. 499,197.

This invention relates to safety brakes, and its principal object is to prevent unintentional reverse rotation of a rotatable element, such as a drive shaft. The invention is particularly useful in connection with motor vehicles for preventing unintentional backward movement of the vehicle, as, for instance, when the motor thereof becomes stalled while climbing a hill or when the vehicle is left standing on an incline.

Another object is to provide a safety brake which may be rendered inactive for ordinary driving, and may be instantly moved to an active position wherein it operates to prevent unintentional backward movement of the vehicle and without interfering in any manner with the forward movement thereof.

Other objects and advantages will appear in the course of this specification, and with said objects and advantages in view, this invention consists in the several novel features of construction, arrangement and combination of parts hereinafter fully set forth and claimed.

The invention is clearly illustrated in the accompanying drawing in which—

Figure 1 is a plan of a safety brake embodying one form of the present invention;

Fig. 2 is a vertical cross section taken on the line 2 of Fig. 1;

Fig. 3 is a detail cross section taken on the line 3—3 of Fig. 2; and

Fig. 4 is a fragmental side elevation showing a slightly modified form of the invention.

Referring to said drawing, the reference character 5 designates a fragment of the transmission gear case of an automobile and 6 the drive shaft thereof. Keyed or otherwise secured to the drive shaft 6 is a brake drum 7 which co-operates with the brake band 8 of the emergency brake mechanism for applying the brake to the drive shaft.

The drawing illustrates one form of emergency brake actuating mechanism, which, as shown, comprises the usual brake band actuating lever 9 connected at one end to the emergency hand brake lever (not shown), and connected between its ends to an eye bolt 10 which extends through lugs 11 riveted or otherwise secured to the free ends of the brake bands. The ends of the brake band are normally spread apart by a coiled spring 14 surrounding the eye bolt 10 and interposed between the lugs 11. A strap 12 supported from the transmission gear case 5 as by a bracket arm 13 extends over the brake band 8 and over the upper lug 11 and is riveted or otherwise secured to the brake band 8 near its upper free end and yieldingly supports the upper free end of the brake band. The lower free end of the brake band is held on a bolt depending from a bracket arm 15 mounted on the frame of the machine, and between its ends the brake band is also supported from the bracket 13 as by a strap 16 secured to the brake band and extending around said bracket 13. The emergency brake mechanism just described is well known and forms standard equipment of a well known make of automobile.

Within the brake drum 7 is a brake shoe 17 which is preferably in the form of a segment and adapted to brake against the internal annular face of the brake drum 7. Both the brake band and the brake shoe are provided with brake linings 18 and 19, as is well understood. The brake shoe 17 is carried by means, such as a link 20, which extends along the open side of the brake drum and is pivotally connected with the brake band 8 and strap 12, as by a pivot pin 21 formed integral with the link 20, which extends through an eye member 22 bolted to the strap 12. A cotter pin 23 in one end of the pin 21 holds the pin in the eye member 22. The brake shoe 17 is pivotally connected to the lower end of the link 20 as by the pivot pin 24 formed integral with the link 20 and extending through an opening in the brake shoe 17.

Means are provided for holding the brake shoe out of contact with the brake drum and for moving it into light contact therewith, and said means may run to the dash or other convenient place in the vehicle where it may be readily manipulated. As shown, a wire or rod 25 is connected to the link 20 by a swiveled block or lug 26 and extends through a flexible guide tube 27 to the dash 28, or other convenient place in the vehicle, where it is provided with a knob or handle 29. In accordance with the usual practice, a sleeved clamp member 30 is provided at the dash for securing the flexible guide tube 27 thereto. The end of the flexible guide tube 27 adjacent the link 20 is supported in an eye 35 which may be formed as a part of the hereinafter described bracket arm 31.

Secured to the strap 12, as by screws or the like, is a bracket arm 31 which co-operates with a lug or other projection 32 on the brake shoe 17 to position the brake shoe when moved to its idle or inactive position. As a preference, a notch 33 is formed in one edge of the bracket arm 31 for receiving the lug 32. The drawing illustrates the brake shoe in its active position braking against the internal face of the brake drum; the brake shoe is moved into this position by pressing inward on the knob 29. When the knob 29 is drawn outward to move the brake shoe into its inactive position, the lug 32 enters the notch 33 in the bracket arm 31, thereby preventing any oscillatory movement of the brake shoe upon its pivot pin 24. Consequently, there is no danger of the brake shoe contacting with the brake drum when held in its inactive position.

In the inactive position of the brake shoe, the pivot pin 24 occupies a position located in an imaginary line drawn between the axes of the pivot pin 21 and drive shaft 6. To prevent the link from being drawn past this position when the brake shoe is being moved into its inactive position, a stop shoulder 34 is provided which may be formed as a part of the eye member 22 which connects the pivot pin 21 with the strap 12.

Normally the brake shoe is held in its inactive position out of engagement with the brake drum, thereby permitting free forward or reverse rotation of the brake drum. When it is desired to set the safety brake, the knob 29 is pushed inwardly, thereby swinging the link 20 into the position seen in Fig. 2 wherein the brake shoe 17 is brought into light contact with the brake drum.

Inasmuch as the forward rotation of the drive shaft and brake drum (which is in the direction of the arrow $a$ in Fig. 2) tends to swing the link 20 back towards its inactive position, no gripping action by the brake shoe results from such movement, but in case the drive shaft begins to revolve in the reverse direction, as indicated by the arrow $b$ in Fig. 2, then the brake drum tends to move the brake shoe along with it, consequently swinging the link 20 in the direction of the arrow $c$ in Fig. 2, thus bringing the brake band 8 down upon the outer face of the brake drum, whereby the brake drum is gripped between the brake band and brake shoe and the braking action thereon takes place.

Means are provided for automatically releasing the safety brake in case the vehicle is intentionally driven is a backward direction when the safety brake is set. As shown, said means comprise a member 36 on the link 20 which lies in the path of movement of the reverse gear shaft 37 of the transmission gearing. As is well understood, the reverse gear shaft 37 is projected somewhat beyond the transmission gear case whenever the gear shift lever is moved into reverse position, and in this case, the gear reverse shaft encounters the member 36 and swings the link 20 into inactive position, thereby retracting the brake shoe from the brake drum. The member 36 is shown in the form of a roller which is rotatably mounted in ears 38 carried by the link 20. The end of the gear reverse shaft 37 may be beveled off, as shown in Fig. 1, so as to obtain a cam action on the roller 36.

From the above it is apparent that whether the safety brake is set or not, the drive shaft is free to rotate in its forward direction, thereby driving the vehicle forward, and that when the safety brake is set into its inactive position, no braking action is placed upon the brake drum while the vehicle is moving in a forward direction. In the event, however, that the drive shaft commences to rotate in a reverse direction, as, for instance, in case the automobile engine becomes stalled while the vehicle is climbing a hill, or in case the vehicle is standing on an inclined place and begins to roll downward in a backward direction, the friction between the brake drum and brake shoe will tend to cause the brake shoe to move along with the drum, thereby swinging the link 20 upon the pivot pin 21, and tightening both the brake band 8 and the brake shoe 17 upon the brake drum and imparting the braking action thereto.

The device provides a very effective brake for the purpose intended, and is entirely automatic in its action, requiring merely the setting of the brake shoe into its active position for subsequent action in case of an emergency.

In the modified form seen in Fig. 4, the parts are substantially the same as the corresponding parts of the preferred embodiment of the invention, except that the link $20^a$ which corresponds with the link 20 of the preferred form is rigidly secured to the brake band $8^a$ and the brake shoe $17^a$, which latter is provided with a slot $20^b$ through which extends a pivot pin $24^b$ extending laterally from the link $20^a$. In this form of the invention, when the brake shoe is set into active position, the brake shoe $17^a$ is moved from one end of the slot $20^b$ to the other upon the pin $24^b$. In this case, however, the actuating wire or rod $25^a$ is connected directly to the brake shoe $17^a$ by a swiveled block or lug $26^a$.

The operation of the parts seen in Fig. 4 is practically the same as that of the corresponding parts of the preferred form, except that the link $20^a$ does not have the oscillatory movement about the pin 21ª. When the brake shoe is set into active position, the brake drum becomes gripped between the brake band 8ª and brake shoe 17ª whenever the drive shaft begins to rotate in a reverse direction.

I claim:

1. A brake in which is comprised a brake drum, a brake shoe within said drum and movable from an inactive to an active position, anchored means carrying said brake shoe for movement towards and away from the brake drum, and manually operated brake shoe releasing and setting means for holding said brake shoe in inactive position, whereby the brake drum may rotate in a reverse direction and for setting said brake shoe into an active position for gripping engagement with the brake drum solely when the brake drum is rotated in a reverse direction.

2. A brake in which is comprised a brake drum, a segmental brake shoe within said drum, a link anchored at one end and carrying said brake shoe, the latter being angularly movable relative to the link and manually operated means for moving said brake shoe into active position for gripping engagement with the brake drum solely when said brake drum is rotated in a reverse direction.

3. A brake in which is comprised a brake drum, a brake band therefor, a brake shoe within the brake drum, a link connecting said brake shoe with said brake band, and manually operated means for setting said brake shoe into an active position, whereby said brake drum is gripped between said brake band and brake shoe solely when the brake drum is rotated in a reverse direction.

4. A brake in which is comprised a brake drum, a brake band therefor, a brake shoe within said brake drum, a link pivotally supported by said brake band and having a pivotal connection with said brake shoe, and manually operated means for setting said brake shoe into active position, whereby said brake drum is gripped between said brake band and brake shoe solely when the brake drum is rotated in a reverse direction.

5. A brake in which is comprised a brake drum, a brake band therefor, a brake shoe within said brake drum, a link pivotally connected to said brake band and having a pivotal connection with the brake shoe, manually operated means for moving said brake shoe into active and inactive position, and a stop member for limiting the movement of the link at the inactive position of the brake shoe.

6. A brake in which is comprised a brake drum, a brake band therefor, a brake shoe within the brake drum, a link pivotally connected to said brake band and having a pivotal connection with the brake shoe, manually operated means for moving said brake shoe to active and inactive positions, a stationary member, and means on said brake shoe co-acting with said stationary member to hold the brake shoe away from the brake drum when in its inactive position.

7. A brake in which is comprised a brake drum, a brake shoe therein, a link pivotally supported at one end and having a pivotal connection with the brake shoe, manually operated means for setting said brake shoe in active position, and means operated by the reverse gear shaft of transmission gearing for retracting the brake shoe from its action position.

8. A brake comprising in combination a brake drum, a brake shoe therein, a link pivotally mounted at one end and having a pivotal connection with the brake shoe, manually operated means for setting said brake shoe into active and inactive position, and means on said link arranged to be actuated by the reverse gear shaft of transmission gearing, whereby said brake shoe is moved to inactive position.

9. A brake in which is comprised a brake drum, a brake band supporting element secured to one end of said brake band, a brake shoe within the brake drum, means for carrying said brake shoe connected with said brake band, and manually operated means for setting said brake shoe into active position.

10. A brake in which is comprised a brake drum, a braking element within said drum and co-operating therewith solely when the brake drum is rotated in a reverse direction, a brake band surrounding said brake drum, connecting means between the brake shoe and brake band, and manually operated means for setting said braking element into active and inactive position.

AXEL W. MOODY.